Oct. 12, 1965 G. I. CARTER ETAL 3,210,855
CENTER-FINDING DEVICE
Filed March 8, 1962 2 Sheets-Sheet 1
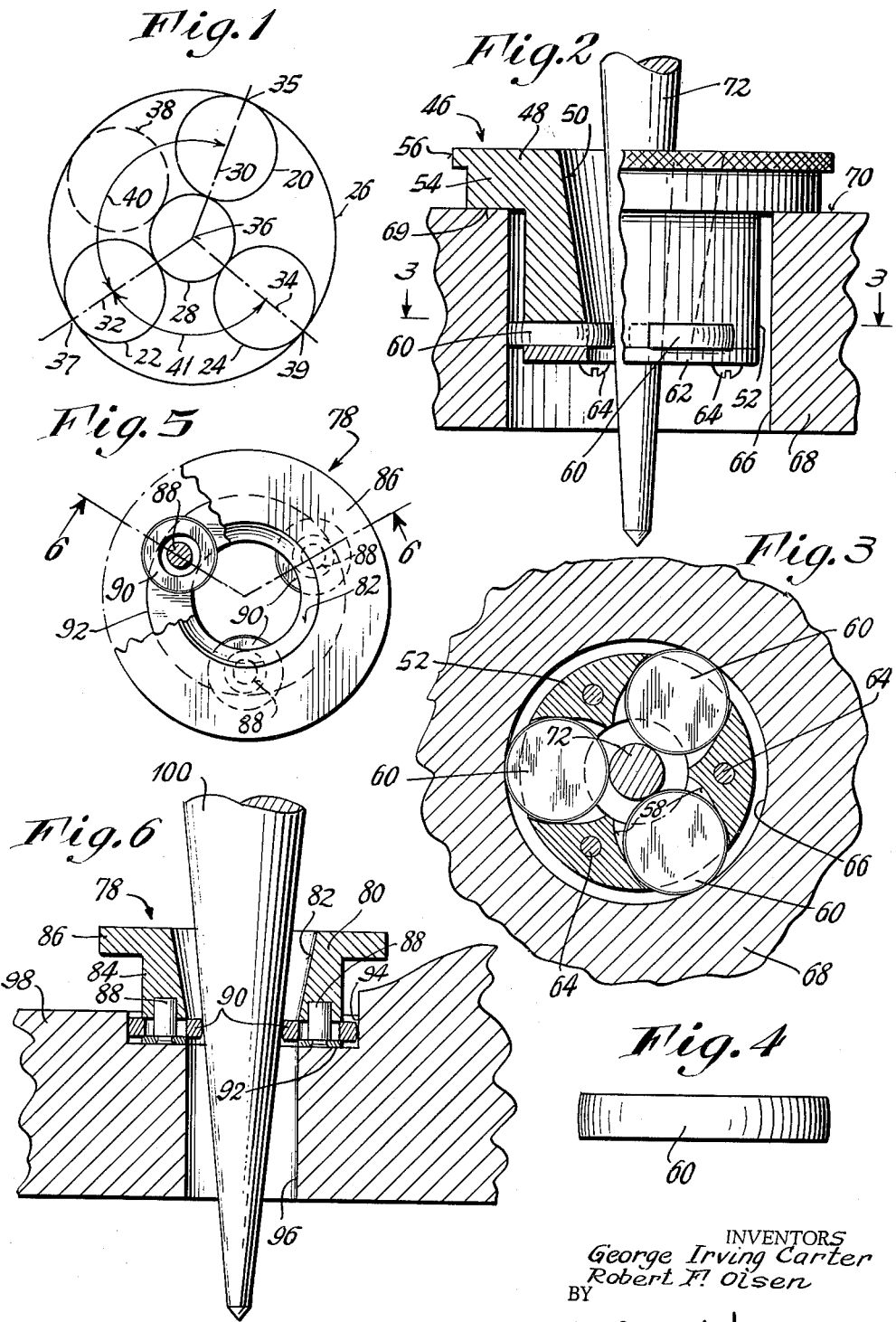
INVENTORS
George Irving Carter
Robert F. Olsen
BY
William W. Jollonf
ATTORNEY Oct. 12, 1965  G. I. CARTER ETAL  3,210,855
CENTER-FINDING DEVICE
Filed March 8, 1962  2 Sheets-Sheet 2
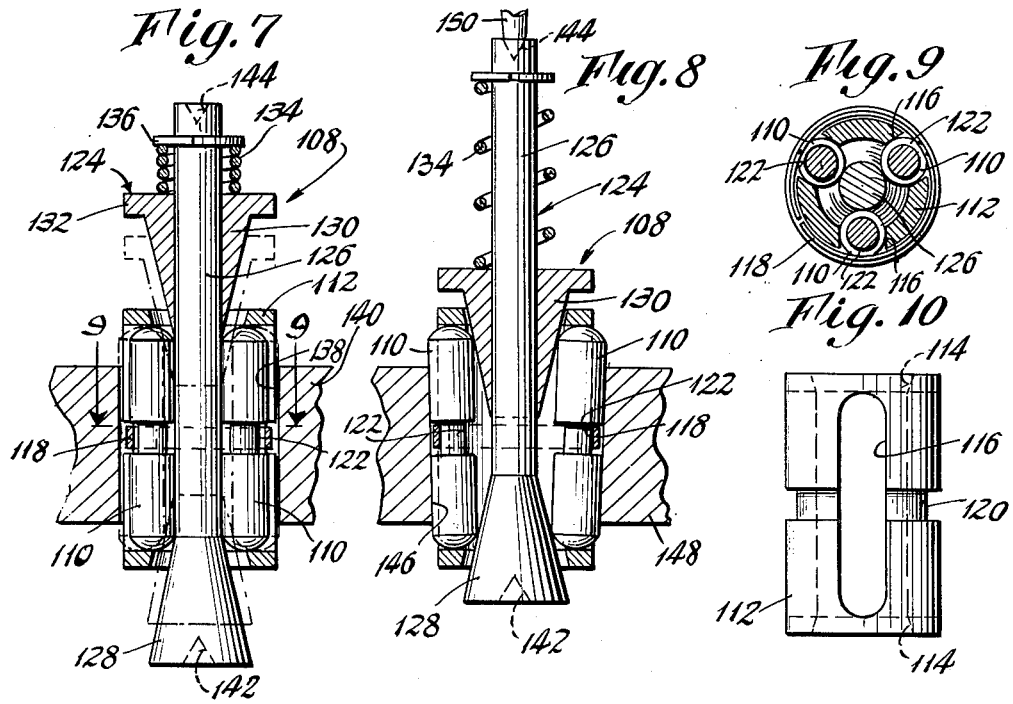
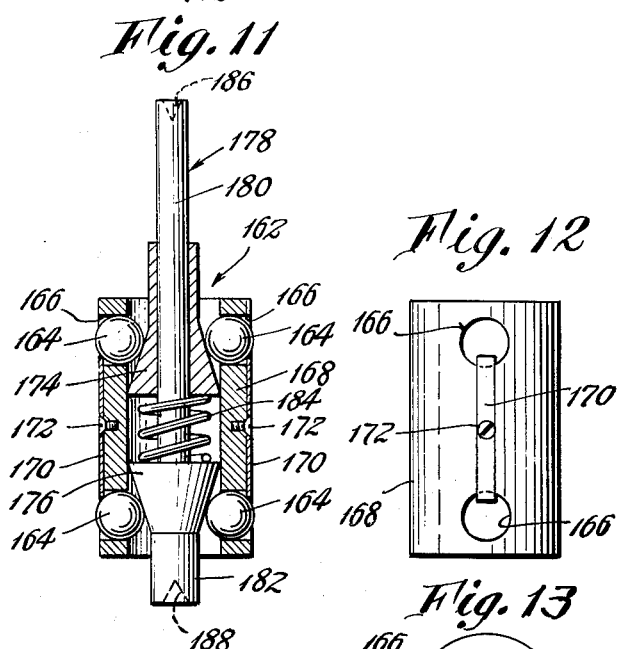
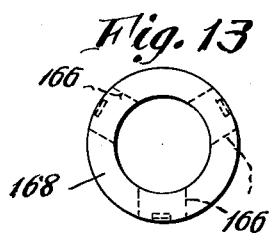
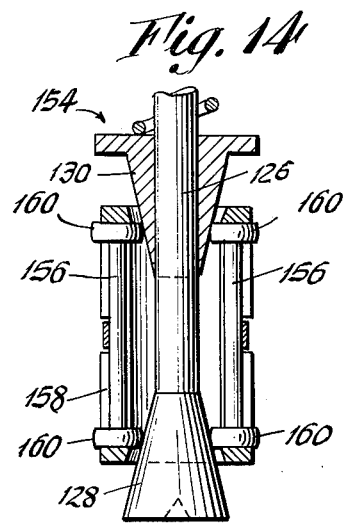
INVENTORS
George Irving Carter
Robert F. Olsen
BY William W. Holton Jr.
ATTORNEY

3,210,855
CENTER-FINDING DEVICE

George Irving Carter, Stamford, and Robert F. Olsen, Greens Farms, Conn., assignors to Pitney-Bowes, Inc., Stamford, Conn., a corporation of Delaware
Filed Mar. 8, 1962, Ser. No. 178,497
1 Claim. (Cl. 33—191)

This invention relates to a center-finding device, and more particularly, to a device useful in locating the center or axis of an internal surface which is circular in cross-section perpendicular to said axis. Such an internal surface is provided by a cylindrical hole, a conically tapered hole, a cylindrical or conically tapered socket, a counterbore, etc., in a workpiece.

The term "cylindrical" as used herein is intended to denote the surface generated by rotating one straight line about another straight line while both of the straight lines remain parallel to each other.

It is common practice, when locating, for example, a cylindrical hole to be drilled in a casting, to measure from a reference point to the center of the hole. When the casting is inspected to determine the accuracy of the location of the drilled hole, common practice has it first to insert into the hole one end of a cylindrical plug gauge which is of an outside diameter to fit nicely into the hole, then to measure from said reference point to the nearest (or farthest) point on the outer periphery of the projecting part of the plug gauge (using Johansson blocks and a height gauge or their equivalent as is well known in the art), and then to add to (or subtract from) this measurement one-half the outside diameter of the plug gauge. This, of course, yields the distance from the reference point to the center of the hole. This practice is subject to disadvantages such as the one that a separate individual plug gauge is required for every different hole diameter that may be encountered.

It is also conventional in the art to determine the accuracy of the location of a cylindrical hole in a workpiece by the use of a so-called coordinate-measuring inspection machine. Such a machine provides a horizontal bed to which the workpiece is secured. A probe or pin conically tapered along a vertical axis is supported above the bed for rotation about its vertical axis and for vertical and horizontal movement relative to the bed. Means such as two electronic or mechanical counters are provided to indicate or read out (1) the amount of horizontal movement of the tapered probe in one direction (which can be taken as the "X axis") and (2) the amount of horizontal movement of the probe in a direction perpendicular to said one direction (the "Y axis"). In use, the tapered probe is horizontally located over a reference point and the readings of the two counters are recorded or "zeroed." The probe is then moved horizontally to a location above the hole whose location is to be checked and then moved vertically downward until the probe approximately seats in the hole. The probe is then rotated slightly, better to seat it in the hole to bring its axis into coincidence with the axis of the hole. The distance moved horizontally by the probe along the X and Y axes from the reference point to the vertical axis of the probe is read out from the two counters, and the straight-line distance from said vertical axis (which is located at the axis or center of the hole) to the reference point is computed.

This latter method is subject to a number of disadvantages. When the tapered probe is inserted into the cylindrical hole, contact by the probe with the sidewall of the hole is at the circular edge defined by the intersection of the upper surface of the workpiece and the sidewall of the hole. Consequently, if there is a burr or an uneven chamfer at this edge, even seating of the probe is impossible. Even seating of the probe is also impossible when the upper surface of the workpiece is rough or otherwise uneven and when the upper surface of the workpiece is not perpendicular to the axis of the hole. Also, the rotation of the tapered probe to seat it evenly against the circular edge of the hole sidewall is opposed by the friction, particularly the static friction, between the probe and this edge. It will be apparent that the probe tends to be wedged at this edge so that considerable difficulty is encountered in evenly seating the probe. In addition, several different probes, each of a different angle of taper, must be kept on hand and substituted one for another to accommodate the various diameters and depths of holes that may be encountered.

The present invention overcomes the above-noted disadvantages and provides additional advantages. This invention utilizes the geometrical principle that when each one of at least three equal-diameter circles is tangent to both an inner circle and an outer circle, said inner and outer circles are concentric with each other (i.e., the centers of the inner and outer circles coincide). A center-finding device according to the invention includes a support mounting at least one set of at least three elements. All of the elements have a circular periphery of a common diameter and each is confined against movement along the axis of its circular periphery. Each of these elements is movable transversely of its respective axis. The extent of movement of each element transversely of its axis is confined such that, when the circular peripheries of all of these elements are tangent to either an inner or outer circle, an angle greater than 180° is subtended about the center of that circle from the center of the circular periphery of each element past the center of the circular periphery of each next adjacent one of the elements to the center of the circular periphery of a third one of said elements.

In use, the support of the center-finding device is juxtaposed with a cylindrical hole in a workpiece such that each of said elements is within the hole with its circular periphery lying transversely of the axis of the hole. A conically tapered member is entered along a path extending radially inwardly of said elements whereby the latter are urged radially outwardly until the circular peripheries of all of the elements engage the sidewall of the hole. Since the circular-periphery elements contact the sidewall of the hole at points within the hole rather than at the outer edge thereof, the presence of a burr or uneven chamfer at this edge and the condition of the workpiece surface can have no deleterious effect. To ensure that the circular periphery of each one of the elements is evenly engaged by the conically tapered member and by the sidewall of the hole, the support can be rotated about the axis of the hole. Such rotation is facilitated by the free rotation of the elements which substantially eliminates friction at the respective points of engagement between the elements and the tapered member and the sidewall of the hole. The axis of the conically tapered member will then coincide with the center of the hole, and measurement can then readily be made from this axis to a reference point by utilizing a coordinate-measuring inspection machine or a height gauge and Johansson blocks. With the present invention, then, a single center-finding device can be used for a wide range of hole sizes as distinguished from the requirement of a separate plug for each different-sized hole. Also, no substitution of conically tapered pins is required for locating the centers of a wide range of hole sizes.

Accordingly, an object of the invention is the provision of a new and improved device for locating the center or axis of an internal cylindrical surface which is circular in cross-section perpendicular to said axis.

Another object is to provide such a device which is effective over a wide range of hole sizes.

Further objects are to provide such a device which is economical to produce, which enables more accurate location of such centers, which is useful in detecting out-of-round holes, and which overcomes objectionable friction when rotated while locating the center of a hole.

Further objects and advantages will become apparent as the description proceeds.

Several embodiments of the invention are shown in the accompanying drawing wherein:

FIG. 1 is a geometrical layout illustrating the principle on which the present invention is based;

FIG. 2 is a side elevational view partly in section of a center-finding device according to a first embodiment of the invention, this view showing a conically tapered pin entered into the center-finding device which is juxtaposed with a cylindrical hole in a workpiece;

FIG. 3 is a sectional view taken along the section line 3—3 in FIG. 2;

FIG. 4 is a side view on an enlarged scale of one of the three elements of the device shown in FIGS. 2 and 3;

FIG. 5 is a top plan view partly broken away of a center-finding device according to a second embodiment of the invention;

FIG. 6 is an elevational view taken in section along the section line 6—6 in FIG. 5 and showing a conically tapered pin entered into the center-finding device which is juxtaposed with a counterbore in a workpiece;

FIG. 7 is a side elevational view partly in section of a center-finding device according to a third embodiment of the invention, this view showing the device in juxtaposition with a cylindrical hole in a workpiece;

FIG. 8 is a view similar to that of FIG. 7 but showing the center-finding device of FIG. 7 in juxtaposition with a conically tapered hole in a workpiece;

FIG. 9 is a sectional view taken along the line 9—9 in FIG. 7;

FIG. 10 is an elevational view of the support of the center-finding device shown in FIGS. 7-9;

FIG. 11 is a side elevational sectional view of a center-finding device according to a fourth embodiment of the invention;

FIG. 12 is a side elevational view of the support of the center-finding device shown in FIG. 11;

FIG. 13 is a top plan view of the support of FIG. 12; and

FIG. 14 is a side elevational view partly in section of a center-finding device similar to, but incorporating a modification of, that shown in FIGS. 7-10.

Referring to FIG. 1, it will be seen that, by construction, each one of the circles 20, 22 and 24 is of the same diameter, each of these circles is tangent to an outer circle 26 and to an inner circle 28, and each of the three straight lines 30, 32 and 34 is drawn perpendicular to the common tangent of the inner circle 28 with a respective one of the circles 20, 22 and 24. As can be seen in FIG. 1, all three of the lines 30, 32 and 34 intersect at a common point 36. This point 36 is the center of the inner circle 28 because any straight line drawn perpendicular to a tangent of a circle passes through the center of that circle and, as stated above, each one of the lines 30, 32 and 34 is perpendicular to a respective tangent of the inner circle 28. It also follows that each line 30, 32 and 34 passes through the center of a respective one of the equal-diameter circles 20, 22 and 24. Any straight line that passes through the center of a circle intersects that circle at two points and is perpendicular to the tangents of that circle at these two points of intersection. Consequently, each of the straight lines 30, 32 and 34 is perpendicular to the tangent of the respective one of the equal diameter circles at the points 35, 37 and 39, respectively. By inspection, it can be seen in FIG. 1 that the points 35, 37 and 39 coincide with points at which the outer circle 26 is tangent to the three equal-diameter circles 20, 22 and 24. Accordingly, the point 36 is also the center of the outer circle 26 since any line drawn perpendicular to a tangent of a circle passes through the center of that circle and each one of the lines 30, 32 and 34 is perpendicular to a tangent of the outer circle 26. This coincidence of the centers of the outer and inner circles 26 and 28 holds true so long as the circles 20, 22 and 24 are of equal diameters. Confirming this is the fact that the length of each of the lines 30, 32 and 34 from the point 36 to the respective one of the points 35, 37 and 39 are equal (each of these lengths being equal to the radius of the inner circle 28 plus the common diameter of the circles 20, 22 and 24); and the center of a circle (in this case, the center 36 of the circle 26) is the only point within that circle from which as many as three straight lines of equal length can be drawn, each to a different point on the circle.

From the immediately preceding paragraph it can be seen that if each one of three equal-diameter circles is tangent to an inner circle and to an outer circle, the centers of the inner and outer circles coincide. Referring again to FIG. 1, it is apparent that neither one of the outer and inner circles 26 and 28 can be moved in the plane of this figure without crossing at least one of the equal-diameter circles 20, 22 and 24. This would not be the case if, for example, the circle 24 were eliminated and the broken-line circle 38 were substituted therefor. The broken-line circle 38, like the circle 24, is tangent to both of the outer and inner circles 26 and 28 and is of the same diameter as these latter two circles. It can be seen that with this substitution, the outer circle 26 could be moved upwardly and to the left and the inner circle 28 could be moved downwardly and to the right, both without crossing any one of the circles 20, 22 and 38. The characteristic of the arrangement of the three circles 20, 22 and 24 which accounts for this difference over the arrangement of the three circles 20, 22 and 38 is that an angle of greater than 180° is subtended about the common center 36 of both the inner and outer circles 28 and 26 from the center of each one of the circles 20, 22 and 24 past the center of each next adjacent one of the circles 20, 22 and 24 to the center of the third one of the circles 20, 22 and 24. For example, the angle subtended about the center 36 by the arc 40 in FIG. 1, is from the center of circle 22 to the center of circle 20 and the angle subtended about the center 36 by the arc 41 is from the center of the circle 22 to the center of the circle 24. Obviously, the sum of the angles subtended by these two arcs is greater than 180°. It can be seen, however, that if the circle 24 were replaced by the broken-line circle 38, the angle subtended about the center 36 from the center of the circle 20 past the center of the circle 38 to the center of the circle 22 is less than 180°. The significance of the above-noted characteristic of the arrangement of the three circles 20, 22 and 24 will become apparent as the description of the disclosed embodiments of the invention proceeds.

Referring to the embodiment shown in FIGS. 2, 3 and 4, the center-fiinding device is generally designated by the reference numeral 46. The device 46 includes a support 48 which provides a conically tapered hole 50 therethrough. The support 48 includes a body section 52 having an outer cylindrical surface integral with an enlarged-diameter section 54. The section 54 is integral with a section 56 which is knurled at its outer periphery.

As best shown in FIG. 3, the lower end of the body section 52 is machined out to provide three guideways 58 each of which extends radially outward from the hole 50. Disposed in each of the guideways is an element in the form of a solid disc 60 having a circular periphery. Retaining the discs 60 within the guideways 58 is an annular retainer 62 secured as by screws 64 to the bottom of the body section 52. The three discs 60 are identical with each other in size and shape. The common thickness of these discs is just slightly less than the depth of the guideways 58 whereby each disc is freely movable along its respective guideway (radially of the center of the hole 50) but is confied against substantial movement in the direction of the axis of its circular periphery. As best shown in FIG. 3, each of the guideways 58 is reduced in width at its radially outer and radially inner ends thereby limiting the extent of movement of the respective disc 60 therealong.

In use, the center-finding device 46 is juxtaposed with a hole 66 drilled in a workpiece 68 such that the three discs are within the hole, with the circular peripheries of these discs lying transversely of the axis of the hole. This juxtaposition of the device 46 with the hole 66 is accomplished by placing the shoulder 69 provided by the enlarged diameter section 54 against the flat face 70 of the workpiece. A conically tapered probe 72 of a coordinate-measuring machine (as previously described) is then inserted along a path extending radially inwardly of the discs 60 until the probe 72, after engaging the three discs 60, urges all three of the latter into engagement with the sidewall of the hole 66. To ensure even engagement of the three discs 60 with the sidewall of the hole 66 and with the tapered probe 72, the device 46 can be rotated by manually grasping the knurled section 56 and rotating the same or by rotating the probe 72 manually or by power means. This rotation of the device 46 overcomes or avoids any substantial amount of friction between the discs 60 and both of the probe 72 and the sidewall of the hole 66 since the discs 60 are freely rotatable. Without more, then, the vertical axis of the conically tapered probe 72 coincides with the axis or center of the hole 66 in the workpiece. In this regard, it is noted that the circular peripheries of the discs 60 correspond to the circles 20, 22 and 24 in FIG. 1, the sidewall of the hole 66 corresponds to the outer circle 26, and the conically tapered probe 72 corresponds to the inner circle 28. This relation can be visualized by comparing FIG. 1 with FIG. 3. It is also noted that the three-point contact of the tapered probe 72 with the three discs 60 confines the axis of the probe 72 against lateral shifting away from concentricity with the axis or center of the workpiece hole 66. This is attributed to the above-noted characteristic (as now applied to the three discs 60) whereby each of the discs 60 is limited in its movement transversely of the axis of its circular periphery by its respective guideway 58 such that an angle greater than 180° is subtended about the common center of the probe 72 and the hole 66 from the center of the circular periphery of each one of the discs 60 past the center of the circular periphery of each next adjacent one of these discs to the center of the circular periphery of the third one of these discs. If this angle were permitted to be less than 180°, the axis of the probe 72 would, of course, not be confined against lateral shifting out of concentricity with the axis of the hole 66.

With the axis of the conically tapered probe 72 coincident with the center of the hole 66, measurement of this center to any convenient reference point can readily be made by retracting the probe 72 from the hole 66, moving the element to the reference point (which could, for example, be the center of another hole in the workpiece 66 or a center punch mark, etc.), and computing the distance moved by the axis of the probe 72.

The circular periphery of each of the discs 60 takes the form of a spherical surface of a common diameter. To provide discs having this spherical surface, it is preferred to grind ball bearings flat from opposite directions. This is a simple and economical procedure by conventional grinding techniques. Such ball bearings are inexpensive and are conventionally formed of wear-resistant material to tolerances within several millionths of an inch. An important advantage of utilizing discs having such a spherical surface is that the axis of the supporting member 48 need not be accurately related angularly with the axis of the hole 66. In this regard, so long as the supporting member 48 is not canted relative to the axis of a cylindrical hole to the extent that each of the discs 60 engages the sidewall of the hole and/or the tapered probe 72 at the respective corner of the spherical surface and one of the flat surfaces of the respective disc, the center-finding capacity of the device 46 remains intact. Stated otherwise, so long as the points of engagement of each of the discs 60 with the sidewall of the hole 66 and with the tapered probe 72 are at the spherical surface of the respective discs 60, it is immaterial that the axis of the supporting member 48 is not parallel or coincident with the axis of the hole when the probe 72 is seated against the discs 60. Since the probe 72 is tapered, however, it is preferred that the axis of the supporting member 48 be substantially aligned (by eye) with the axis of the hole 66 before the probe is seated. This is the case because the greater the angular relation between the axis of the supporting member and the axis of the hole 66 when the probe is seated against the discs 60, the greater will be the difference between the vertical levels at which the respective discs 60 engage the probe and the greater will therefore be the difference between the distances from the axis of the probe to the respective points of engagement of the probe with the respective discs 60. So long as the angle at which the probe 72 tapers is kept reasonably small, however, these differences will be insignificant even though the axis of the supporting member lies at a substantial angle relative to axis of the hole 66 after the probe 72 is seated.

Another advantage of utilizing a spherical surface to form the circular periphery of the discs 60 is that wedging of the tapered probe 72 against the discs 60 is avoided. By way of example, if the circular periphery of each of the discs 60 were cylindrical, the probe 72 would tend to be wedged at the upper corner formed at the intersection of the upper flat surface and the outer periphery of each of the discs.

Although the embodiment of FIGS. 2–4 (as well as each of the remaining disclosed embodiments) incorporates three elements which provide equal diameter circular peripheries, any convenient number of these elements greater than three can be utilized. By limiting the number of these elements to three, however, another advantage of the present invention can be achieved. That is, not only does the device facilitate finding the center of a hole which is circular in cross-section, but this device is also useful in detecting whether or not such a hole is out-of-round. In this regard, when the tapered probe 72 is inserted as shown in FIG. 2 so that each of the discs 60 evenly engages the probe and the sidewall of the hole 66, rotation of the device 46 will cause the tapered probe to shift laterally of its axis and/or to bind between the discs 60 if the hole 66 is out-of-round. Referring to FIG. 1, if the circle 26 were out-of-round the orbital path of each of the circles 20, 22 and 24 between the inner and outer circles 26 and 28 would be non-circular so long as the circle 28 varied in diameter to remain tangential to all three of circles 20, 22 and 24. The same would be the case with the discs 60 if the sidewall of the hole 66 were out-of-round and this would be reflected as lateral shifting of the tapered probe and/or binding of the tapered probe between the discs 60.

It will be clear that, regardless of whether three or more than three equal-diameter elements are provided by this or any of the other disclosed embodiments of the invention, the movement of these elements transversely of the centers of their respective circular peripheries must be limited such that when the circular periphery of each of these elements is tangent to a common inner or outer circle, an angle greater than 180° is subtended about the center of said circle from the center of the circular periphery of each of said elements past the center of the circular periphery of each next adjacent one of said elements to the center of the circular periphery of a third one of said elements.

A second embodiment of the invention is shown in FIGS. 5 and 6. This second embodiment operates in the same manner as the embodiment of FIGS. 2–4 and differs materially from the latter only in the construction of the three equal-diameter elements and the mounting and retaining means therefor. As can be seen in FIGS. 5 and 6, this second embodiment comprises a center-finding device generally designated by the reference numeral 78. The device 78 includes a support 80 which provides a conically tapered hole 82 therethrough. The support 80 includes a body section 84 having an outer cylindrical surface. The body section 84 is integral with an enlarged-diameter section 86. The lower end of the body section 84 provides three sockets spaced 120° apart and within each of which one end of a pin 88 is secured with a force fit. An annular disc 90 having a circular periphery is disposed about each of the pins. The discs 90 are retained about their respective pins by a thin annular retainer 92 which provides three countersunk apertures spaced 120° apart. The retainer is secured to the pins 88 by fitting a reduced-diameter end of each of the pins 88 into one of the countersunk apertures and then staking the ends of the pins 88 into the respective countersink. As an alternative, the retainer 92 could be eliminated and each of the pins 88 could be provided with an integral flat head having a diameter substantially equal to the width of the annular retainer 92. The thickness of the annular discs 90 is slightly less than the distance between the opposed flat faces of the body section 84 and annular retainer 92 whereby each annular disc 90 is confined against substantial movement in the direction of the axis of its circular periphery but is freely rotatable about this axis and is freely movable transversely of this axis. The extent of this movement of the annular discs 90 transversely of the axis of their respective circular peripheries is limited by the pins 88 such that, when the circular peripheries of the annular discs 90 are tangent to a common inner or outer circle, an angle greater than 180° is subtended about the center of that circle from the center of the circular periphery of each of said discs past the center of the circular periphery of each next adjacent one of said discs to the center of the circular periphery of the third one of said discs.

An advantage of the embodiment of FIGS. 5 and 6 is that it is adapted for use in finding or locating the centers of cylindrical holes in thin workpieces and the centers of shallow counterbores. This is demonstrated by FIG. 6 wherein the device 78 is juxtaposed with a shallow counterbore 94 at the end of a hole 96 in workpiece 98, with the bottom surface of the retainer 92 seated on the bottom of the counterbore 94.

In use, a conically tapered probe 100 of a coordinate measuring machine is inserted and the device 78 is manually rotated until the circular peripheries of the annular discs 90 are in even engagement with the sidewall of the counterbore 94 and with the tapered probe 100. This causes the tapered probe 100 to assume a position with its axis coincident with the center of the counterbore, and measurement to a reference point can then be effected as previously described. It will be apparent that the minimal thickness of the retainer 90 permits use of the device 78 on thin workpieces and workpieces having shallow counterbores. The circular periphery of each of the discs 90 is defined by a spherical surface of a common diameter, as with the first embodiment and for the same reasons. These annular discs 90 can be made, among other methods, by drilling a hole in each one of a plurality of solid discs such as the discs 60 of the embodiment of FIGS. 2–4.

FIGS. 7–10 show a third embodiment of the invention, the center-finding device of this embodiment being generally indicated by the reference numeral 108. This embodiment includes three elements 110. The circular periphery of each of these elements is provided by the outer cylindrical surface of these elements whereby line contact with the sidewall of the hole being checked is made by each of these elements as contrasted with the point contact made by the discs 60 and 90 of the first and second embodiments, respectively.

Referring to FIGS. 7, 9 and 10, the cylindrical elements 110 are provided with spherical ends. These elements are carried by a support 112 which takes the form of a tubular member having a countersink 114 at each end. Three slots 116 are milled out of the tubular support at 120° intervals. The length of each of the slots 116 is just slightly greater than the length of each of the elements 110 whereby each element is confined against substantial movement in the direction of the axis of its circular periphery. Each of the elements 110 is rotatable about its axis and is movable transversely of its axis. The elements 110 are retained within their respective slots 116 by a flexible split ring 118. In this regard, a recess or groove 120 is machined out of the periphery of the support as best shown in FIG. 10, and a recess or groove 122 is machined out of each of the cylindrical elements 110. As best shown in FIGS. 7 and 9, the split ring 118 is disposed within the groove 120 of the support and the grooves 122 of the elements 110. In this manner, the split ring 118 resiliently biases the elements 110 radially inwardly. The extent of radially inward movement of each of the elements 110 is defined by the engagement of these elements with an internal expander generally designated at 124. The expander 124 includes an inner member in the form of a cylindrical shank 126 integral with a conically tapered member 128. Slidably mounted on the shank 126 is conically tapered member 130 which includes an enlarged diameter section 132. A helical compression spring 134 resiliently biases the two conically tapered members 128 and 130 for movement relative to each other for urging the three elements 110 radially outward. The extent of this radially outward movement of each of the elements 110 is defined by the engagement of the conically tapered members 128 and 130 with the respective countersinks 114, 114 at the opposite ends of the tubular support 112. One end of the spring 134 engages a spring clip 136 disposed in a groove in the shank 112, and the opposite end of the spring is biased against the conically tapered member 130.

In use, an operator can grasp the conically tapered member 130 between two fingers of one hand just beneath the enlarged-diameter section 132 and, by pressing against the upper end of the shank 126 with the thumb of the same hand, move the conically tapered members 128 and 130 apart against the bias of the spring 134. The device 108 is then juxtaposed with a hole 138 in a workpiece 140 with the elements 110 disposed therewithin as shown in FIG. 7. The conically tapered members 128 and 130 are then permitted to move apart under the bias of the spring 134 until both of the conically tapered members 128 and 130 engage and radially outwardly urge each of the elements 110 into line contact with the sidewall of the cylindrical hole 138 as shown in broken lines in FIG. 7. Then the support 112 can be rotated to ensure even engagement of the elements 110 with the conically tapered members 128, 130 and with the sidewall of the hole 138. Without more, the axis of the shank 126, which coincides with the axes of the conically tapered members 128 and 130, also coincides with the axis of the hole 138. The tip of a conically tapered probe of a coordinate measuring machine can then be inserted to seat in a conically tapered bore 142 or 144 in one of the respective opposite ends of the shank 126 to align the axis of the probe with the center of the hole 138. Alternatively, a height gauge and Johansson blocks can be used to measure from a reference point to the nearest (or farthest) point on the outer periphery of the projecting part of the shank 126 after which the radius of the shank 126 is added (or subtracted) just as is presently done when using plug gauges.

FIG. 8 demonstrates that the center-finding device 108 can be utilized to locate the axis or center of a conically tapered bore. FIG. 8 shows the device 108 juxtaposed with a conically tapered bore 146 of a workpiece 148 and with the tip of a conically tapered probe 150 of a coordinate measuring inspection machine seated in the bore 144 at the upper end of the shank 126.

An advantage of the center-finding device 108 according to the third embodiment, which advantage applies also to the modification of FIG. 14 and to the embodiment shown in FIGS. 11 and 12, is that it is self-supporting or self-retaining. That is, the workpiece can be turned on its side, turned upside down, etc. without dislodgement of the device from its center finding relation with the hole in the workpiece.

As with the corresponding elements of each of the other embodiments disclosed herein, the circular peripheries of the elements 110 are equal to each other. Although line contact is made by each of the elements 110 with the sidewall of the hole 138, only two point contact, preferably at or closely adjacent the ends thereof, of these elements need be made. This is demonstrated by the modification shown in FIG. 14. The device 154 of this embodiment is identical with the device 108 of the embodiment of FIGS. 7–10 except that three dumbbell-shaped elements 156 are substituted for the three cylindrical elements 110. Each one of the dumbbell-shaped elements 156 comprises a cylindrical shank 158 integral at each end thereof with a solid disc 160. The circular periphery of each of the discs 160, as with each of the discs 60 and 90 of previously described embodiments, takes the form of a spherical surface. The diameters of the circular peripheries of the discs 160 are equal to each other. The use of the modified device 154 is the same as that of the device 108.

A fourth embodiment of the invention is shown in FIGS. 11–13. According to this embodiment, a center-finding device generally indicated at 162 is provided with two sets of spherical elements 164. The three spherical elements 164 of each set must be of the same diameter and, in the embodiment shown in FIGS. 11 and 12, all six elements are of equal diameters. One of the spherical elements 164 of each set is disposed in each one of three radially extending cylindrical holes or guideways 166 provided by a tubular support 168. The six spherical elements 164 are retained in their respective guideways 166 by means of three flexible retainers 170. Each of the retainers lies in a complementary groove in the support 168 and is secured, as by a screw 172, to the support 168. The retainers 170 are formed of thin strips of spring steel. Preferably, the spherical elements 164 are conventional ball bearings.

Disposed radially inwardly of the two sets of spherical elements 164 are two conically tapered members 174 and 176 of an internal expander generally designated by the reference numeral 178. The conically tapered member 176 is integral at one end with a shank 180 and at its opposite end with an enlarged-diameter shank 182. The conically tapered member 174 is slidable on the shank 180 with its axis aligned with the axis of the conically tapered member 176 and with the axes of the shanks 180, 182. One end of a helical compression spring 184 is biased against each one of the tapered members 174 and 176, thereby resiliently to bias these latter two members apart and in the respective directions to bias the spherical elements 164 of both sets radially outwardly.

The center-finding device 162 is shown in FIG. 11 with the conically tapered members 174, 176 moved toward each other preparatory to juxtaposing this device with a hole whose center is to be located. After the spherical elements 164 of both sets are disposed within the hole, the conically tapered members are permitted to move away from each other under the bias of the spring 184. When the spherical elements 164 are evenly seated against the sidewall of the hole and against the respective one of the conically tapered members 174, 176, the axes of the shanks 180 and 182 will be aligned with the center of the hole. As with the embodiment of FIGS. 7–10, the tip of the conically tapered probe of a coordinate measuring machine can be seated in either one of the conically tapered bores 186 and 188, thereby to locate that tip in alignment with the center of the hole, or a height gauge and Johansson blocks can be used to measure to the periphery of the shank 180 in the manner described above in connection with the embodiment of FIGS. 7–10. As can be seen in FIG. 11, the bores 186 and 188 are located at the ends of the shanks 180 and 182, respectively, and these bores are both in alignment with the common axis of these shanks.

If desired, the guideways 166 for the upper set of spherical elements 164 could be disposed to extend radially downwardly perpendicular to the surface of the conically tapered member 174, and the guideways 166 for the lower set of spherical elements 164 could be disposed to extend radially upwardly perpendicular to the surface of the conically tapered member 176, as opposed to having all of these guideways extend radially perpendicular to the axes of the conically tapered members 174 and 176 as shown in FIG. 11. It is noted that, by so modifying the guideways 166, a straight line connecting the points of engagement by each spherical element with the sidewall of the hole and with the respective conically tapered member 174 or 176, would come closer to passing through the center of that spherical element than is the case before effecting this modification. This would decrease the force required to be exerted by the spring 184 in urging the spherical elements radially outwardly because less of this force would then be taken up the sidewalls of the guideways 166. This is not necessary, of course, it being noted that, with none of the disclosed embodiments does a straight line connecting the points of contact of any one of the circular-periphery elements with the sidewall of the hole and with the respective conically tapered element (the latter being the conically tapered probe 72 or 100 in the first and second embodiments and being the conically tapered members 128, 130 and 174, 176 in the third and fourth embodiments, respectively) pass through the center of symmetry of that circular-periphery element. This is obviously the case because the outer surface of the respective conically tapered element in each of the disclosed embodiments has a taper different than that of the workpiece hole whose center is being located. The workpiece holes in each of FIGS. 2, 6 and 7 have zero taper and the taper of the conically tapered hole 146 in FIG. 8 is substantially less than that of the conically tapered member 130. In any case, so long as the points (or lines) of engagement, by each of the circular-periphery elements with the sidewall of the workpiece hole and with the respective conically tapered element, are at the circular periphery thereof, the center-finding capacity of the device remains intact.

It will be clear that with the sets of equal-diameter circular periphery elements 110, 160, and 164 of the embodiments of FIGS. 7–10, 14 and 11–13, respectively, the free movement of these elements of each set is confined such that when these elements of each set are tangent to an inner or an outer circle, an angle greater than 180° is subtended about the center of that circle from the center of one of these elements of the respective set past the center of the circular periphery of each next adjacent one of these elements of the respective set to the center of the circular periphery of the third one of these elements of the respective set. It will also be clear that another advantage of each of the embodiments of FIGS. 7–10, 14 and 11–13, respectively, lies in the fact that the device of each of these embodiments is not only self-retaining as described above, but is also self-centering apart from any cooperation with a conically tapered probe such as those utilized in connection with the embodiments of FIGS. 1–4 and FIGS. 5 and 6.

Since many changes can be made in the embodiments of the invention particularly described and shown herein without departing from the scope of the invention, it is intended that these embodiments be considered as exemplary and that the invention not be limited except as warranted by the following claim.

What is claimed is:

A device for locating the axis of an internal surface which is circular in cross-section perpendicular to said axis, said device comprising three elongated contact elements each of said contact elements having a circular periphery of a common diameter and being formed with an axially elongated outer cylindrical surface and with spherically shaped ends;

each of said contact elements also being formed with a necked down portion along the length thereof;

a tubular support member mounting said contact elements for transverse and rotational movement;

said tubular support member having a circular peripheral groove formed therein and also three longitudinally extending slots formed through the walls thereof for receiving said contact elements;

said slots subtending an arc of more than 180° about the axis of said tubular support member;

an inner supporting shaft;

said shaft being provided with an end recess that is coaxially disposed with respect to said shaft;

a pair of conically tapered members carried by said supporting shaft with the axis of said tapered members being coincident with the axis of said shaft, one of said tapered members being axially movable on said shaft relative to the other tapered member;

means for resiliently biasing at least one of said tapered members along said axis of said inner supporting shaft and against the peripheries of said contact elements for urging each of said cylindrical surfaces radially outwardly of said shaft and into engagement with the said internal surface whereby the axes of said shaft and recess coincide with the axis of said internal surface; and a split ring disposed in said peripheral groove in said tubular support member and extending through said necked down portions of said contact elements so as to yieldably retain said contact elements, said tubular support member and said conically tapered members in mutual operative relation.

References Cited by the Examiner

UNITED STATES PATENTS

| 1,008,842 | 11/11 | Mair | 33—178 |
| 1,423,542 | 7/22 | Rockwell | 13—178 |
| 2,694,261 | 11/54 | Dulligan | 33—178 |
| 2,766,532 | 10/56 | Eisele | 33—174 |
| 2,792,635 | 5/57 | Bird | 33—178 |
| 3,100,117 | 8/63 | Schneider | 33—174 |

FOREIGN PATENTS 262,608 10/49 Switzerland.

ISAAC LISANN, *Primary Examiner.*